March 18, 1941.    A. L. BRICE    2,234,959
AIR CONTROL FOR STOKERS
Filed Sept. 16, 1937    3 Sheets-Sheet 1
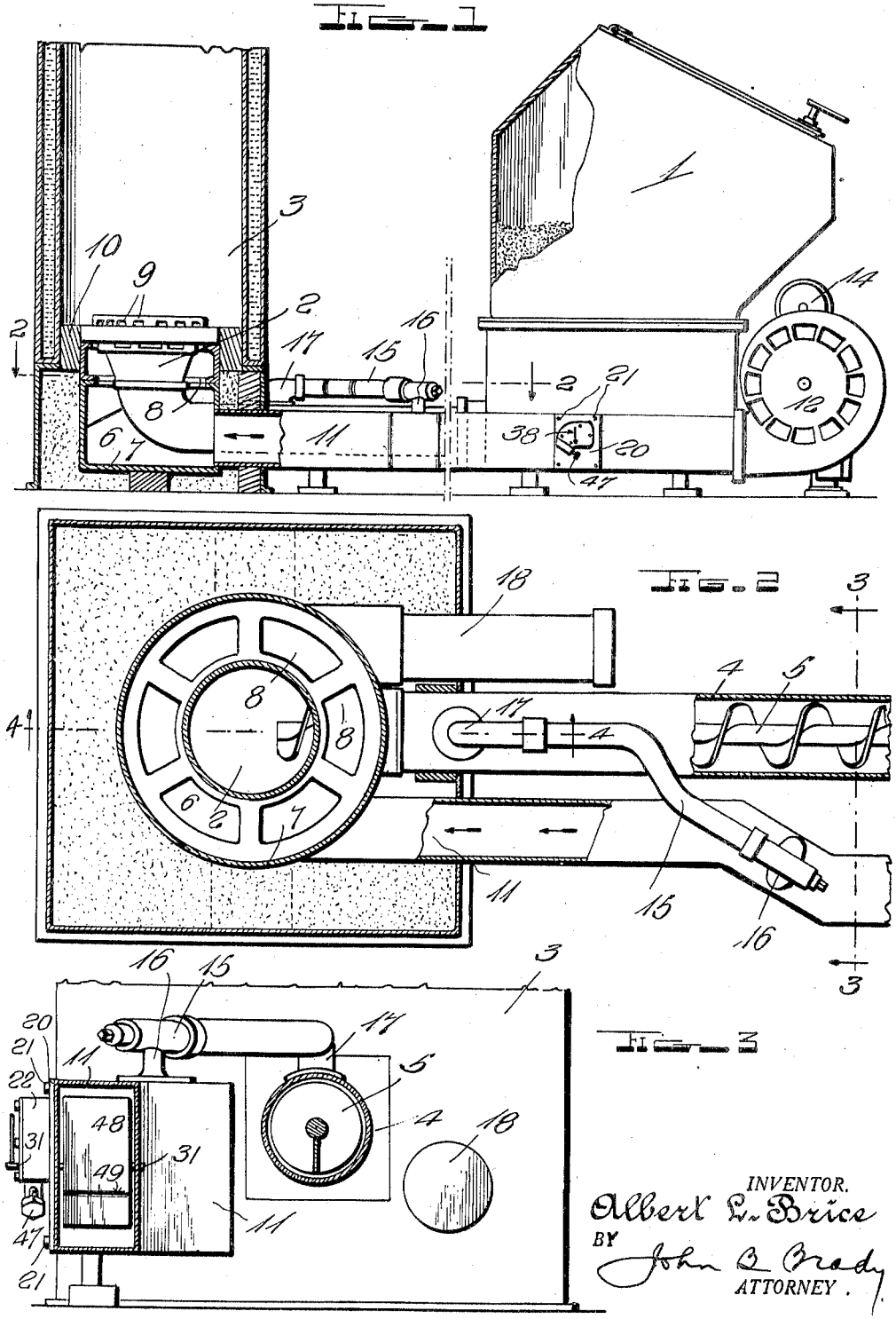
INVENTOR.
Albert L. Brice
BY John C. Brady
ATTORNEY.

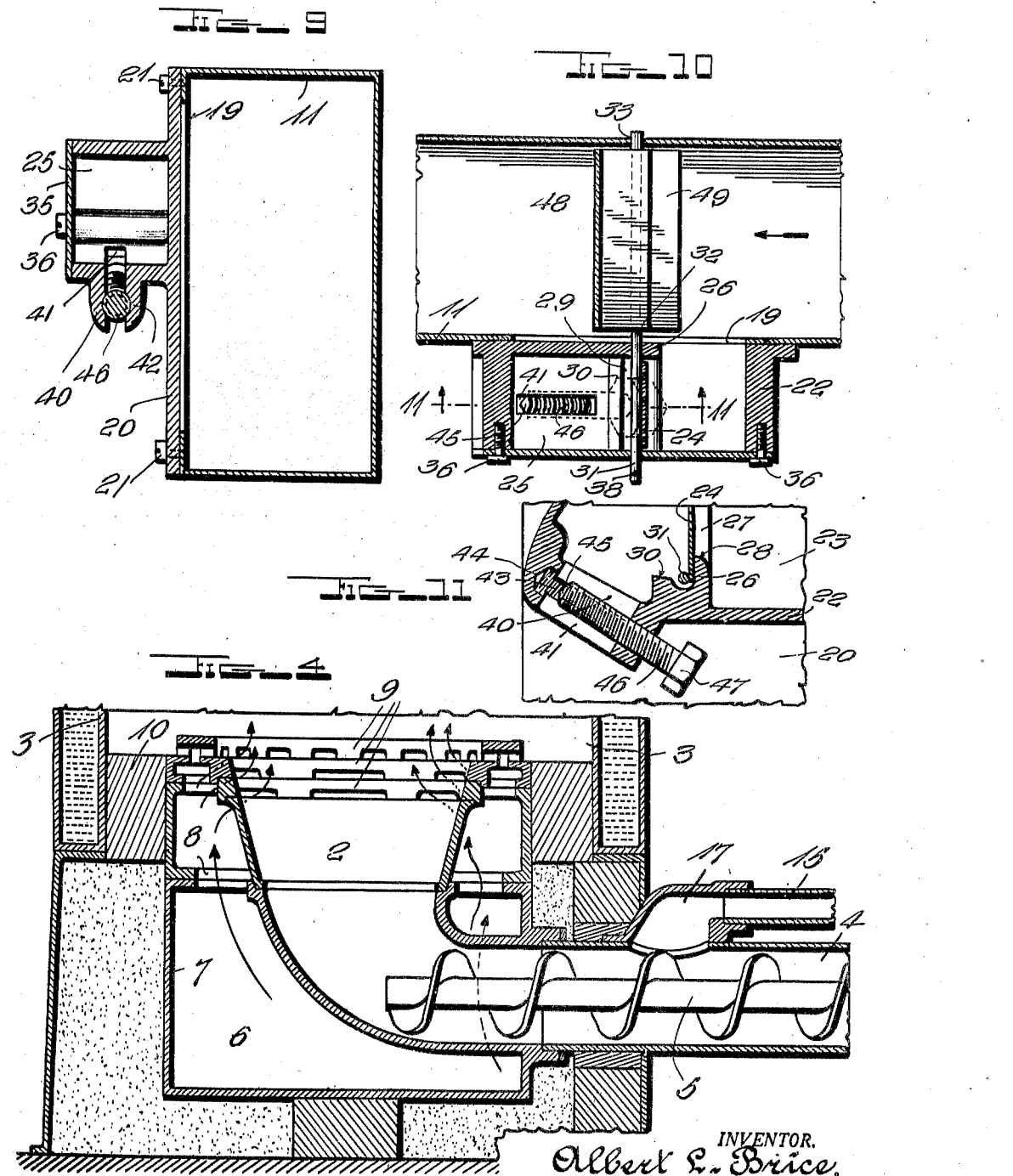

March 18, 1941.  A. L. BRICE  2,234,959
AIR CONTROL FOR STOKERS
Filed Sept. 16, 1937  3 Sheets-Sheet 3
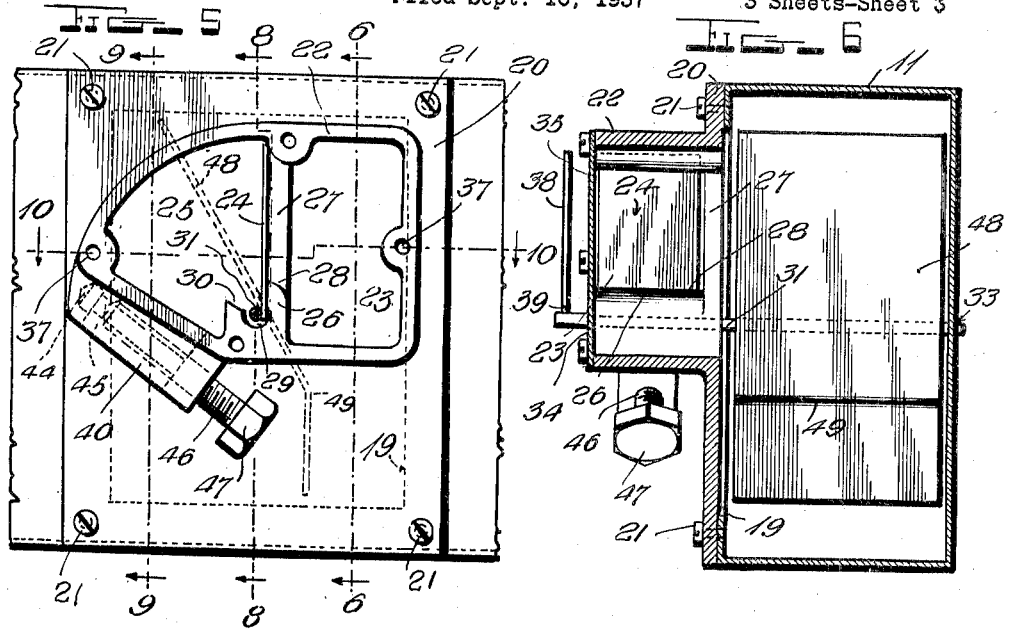
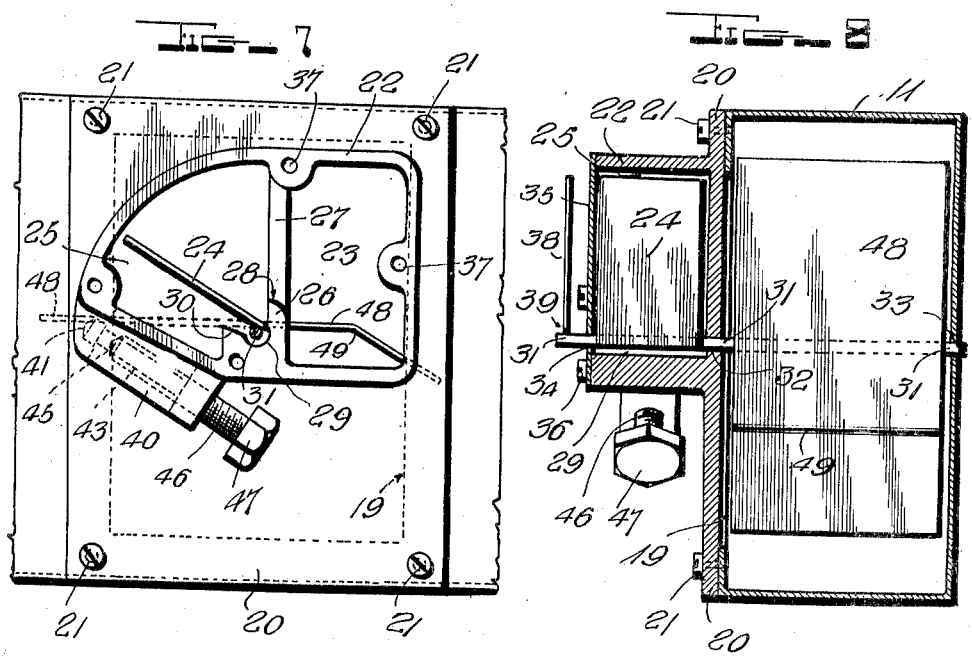
INVENTOR.
Albert L. Brice,
BY John C. Grady
ATTORNEY Patented Mar. 18, 1941

2,234,959

UNITED STATES PATENT OFFICE 2,234,959

AIR CONTROL FOR STOKERS

Albert L. Brice, Frederick, Md., assignor to The Frederick Iron and Steel Company, Frederick, Md., a corporation of Maryland Application September 16, 1937, Serial No. 164,229

3 Claims. (Cl. 236—45)

My invention relates broadly to stokers and more particularly to a method and apparatus for controlling the supply of air to stokers.

One of the objects of my invention is to provide a construction of regulator for the air supply to stokers by which the quantity of air supply to the stoker is controlled with a high degree of precision.

Another object of my invention is to provide an improved construction of air control system for stokers having means for automatically shutting off the air supply to the fuel bed under conditions where blow-holes may occur in the fuel bed and thus preserving the remaining structure of the fuel bed and allowing the same to be restored to the normal condition of combustion.

A further object of my invention is to provide an improved regulator which may be readily installed on existing stokers for governing the combustion in the retort and preventing the destructive effects of velocity blasts through the fuel bed under conditions where blowholes develop.

Another object of my invention is to provide a construction of an air blast velocity controlled damper operating in coaction with a pressure controlled vane in the air supply duct of a stoker and automatically responsive to changes in pressure and velocity for controlling the supply of air through the fuel bed.

Still another object of my invention is to provide a construction of velocity controlled valve for use in the air supply duct of a stoker and coacting with a pressure controlled vane by which variations in both pressure and velocity are utilized to regulate the supply of air to the stoker.

Still another object of my invention is to provide an air regulating system for stokers which includes in combination with the air supply duct of a stoker, a velocity controlled valve and a pressure controlled vane with variable control means associated with the pressure controlled vane for predetermining the air supply cut off according to the condition of combustion in the fuel bed.

Still another object of my invention is to provide a construction of pressure regulator for a velocity controlled valve in the air supply duct of a stoker.

Other and further objects of my invention reside in the arrangement of air blast velocity controlled damper and pressure controlled vane coacting therewith for regulating the quantity of air supplied to a stoker as set forth more fully in the specification hereinafter following by reference to the accompanying drawings in which:

Figure 1 is a side elevation partly in section of a stoker constructed and equipped in accordance with my invention; Fig. 2 is a horizontal sectional view taken on line 2—2 of Fig. 1; Fig. 3 is a transverse vertical section taken on line 3—3 of Fig. 2; Fig. 4 is a central vertical longitudinal sectional view taken substantially on line 4—4 of Fig. 2; Fig. 5 is a side elevation of a portion of the air conveying duct showing the regulator of my invention in position with the cover plate removed to show the interior; Fig. 6 is a transverse section taken on line 6—6 of Fig. 5; Fig. 7 is a view similar to Fig. 5, but showing the parts in the position they assume for normal air supply to the stoker; Fig. 8 is a transverse vertical section taken on line 8—8 of Fig. 5; Fig. 9 is a transverse vertical section taken on line 9—9 of Fig. 5; Fig. 10 is a horizontal section taken on line 10—10 of Fig. 5; and Fig. 11 is a detailed vertical section taken on line 11—11 of Fig. 10.

My invention is directed to an improved air control system for stokers whereby uniformity in combustion is assured. I have found that in burning various coals efficiently, that the air for combustion must be controlled within very narrow limits. When starting a new fire in the retort of a stoker, the air pressure underneath the fuel bed is relatively low and the air velocity relatively high in the air supply duct by reason of the fact that the air tends to escape without a back pressure. A similar condition occurs when the fuel bed develops a hole or holes therein. The forced air tends to blast through such hole or holes disturbing the fuel bed and tending to burn the fuel rapidly adjacent the blast hole while impairing the burning of the fuel at the other points in the fuel bed. The velocity of flow of air through the blast holes also chills the furnace gases and the furnace walls impairing the heating efficiency. My invention provides a mechanism which may be readily applied to the air duct of existing stokers or which may be readily included in the stoker assembly during the manufacture thereof and which regulates the air supply to the retort for preventing unrestricted increases in velocity of air flow for maintaining combustion in the retort substantially uniform. I provide an arrangement of velocity controlled damper and pressure controlled vane, which are subjected respectively to the velocity of air flow and the pressure incident thereto which is established in the air duct extending to the wind box and air chamber which surrounds the retort. The velocity controlled damper and the pressure controlled vane are coordinated in movement one with respect to the other according to the conditions of velocity and pressure in the air supply duct leading to the air chamber surrounding the wind box of the retort. The pressure controlled vane is mounted in a casing with atmospheric pressure in one side of the casing and the pressure existent in the air supply duct on the opposite side of the pressure controlled vane in the casing. The velocity controlled damper coacts with the pressure controlled vane so that upon increase in velocity of air flow through the air duct, the velocity controlled damper shifts from a normally biased open position to a position closing the air duct unopposed by the action of the pressure controlled vane which operates upon the reduction in pressure in the air duct to allow the movement of the velocity controlled damper to closed position in the air duct.

The static pressure in the duct varies inversely as the velocity head, and as the forces exerted thereby on the pressure controlled vane and the velocity controlled damper, respectively, are in substantially the same direction on opposite sides of the shaft 31, the position of the vane and damper assembly will change according to which of the forces has momentarily greater effect. The vane and damper assembly will be dynamically balanced in any position intermediate fully opened and fully closed positions, for maintaining the rate of supply of air substantially constant at various velocities, when the moments of the force on the pressure controlled vane and the force on the velocity controlled damper, with respect to the shaft 31, are equal and opposite.

Referring to the drawings in more detail, reference character 1 designates the coal hopper from which the fuel is fed to the retort 2 within the furnace 3 through coal conveying tube 4 by means of screw conveyor 5. The retort 2 is shown centered within the air chamber 6 within the wind box 7. Air ports 8 allow circulation of air through the air chamber for circulation through the tuyères illustrated at 9. The retort is suitably centered with respect to furnace 3 by insulation means represented at 10. Air is supplied to the wind box 7 and to the air chamber 6 through the air duct 11 through which air is forced under control of fan 12. Fan 12 is suitably driven by means of the electric motor indicated at 14. An auxiliary air duct 15 is tapped into the main air supply duct 11 as indicated at 16 for deriving a sufficient air pressure for delivery to the coal conveying tube 4 through connection 17 as will counteract any tendency for gases to travel back from the retort 2 through the coal conveying tube and leak through the hopper 1 and give off injurious gases through the coal therein. A clean-out duct is provided at 18 connected to the wind box 7 opposite the connection of the air supply duct 11 therewith.

The air flow regulating device of my invention is shown more clearly in Figs. 5-11 wherein it will be noted that one of the side walls of the air duct 11 is cut away or apertured at 19 over which a casting is adapted to be secured. The casting comprises a plate 20 which is secured by means of screws 21 to the duct 11, thereby closing the aperture 19 in the side wall of the duct. The casting includes a housing 22, the side walls of which project laterally from the plate 20. The housing 22 is divided into two sections, one constituting a pressure chamber 23 on one side of the pressure controlled vane 24 and the other constituting a pressure chamber 25 on the opposite side of the pressure controlled vane 24. The section 23 is substantially rectangular in shape while section 25 is substantially in the shape of a sector. A partition 26 extending between sections 23 and 25, is apertured as indicated at 27. The partition 26 is shaped at the lower portion of aperture 27 to provide a curved wall 28 in the plane of the partition extending above a longitudinally extending recess 29 and above the longitudinally extending abutment stop 30. A shaft member 31 extends through the longitudinally extending recess 29 and through an aperture 32 in the plate 20 to a position projecting through an aperture 33 in the side of the air duct 11 opposite the side which contains aperture 19. The opposite end of shaft 31 extends through an aperture 34 in closure plate 35 which forms the closure for housing 22. Closure plate 35 is secured to housing 22 by means of screws 36 which extend into screw threaded recesses 37 in walls 22. A pointer 38 is screw threaded into the end of shaft 31 at 39 after closure plate 35 is secured in position by allowing aperture 34 therein to pass over the end of shaft 31.

The sector shaped section 25 of the housing 22 terminates in an outwardly projecting portion 40. The outwardly projecting portion 40 is apertured or slotted as represented at 41 so that a port is provided extending from the outside atmosphere to the pressure chamber 25. The outwardly projecting portion 40 is drilled at 42 and is screw threaded as indicated at 43. The drilled and screw threaded portion terminates in one end of the housing at 44 and is shaped to conform with the shaped end 45 of the adjustable screw threaded member 46. The screw threaded member 46 projects beyond the wall of the housing 22 and is provided with a headed end 47 which may be gripped by a tool for advancing or retracting the screw threaded member 46 in the screw threaded bore 43. By grasping head 47 by a tool and moving screw threaded member 46 in a clockwise direction, the effective area of the passage leading to the pressure chamber 25 is decreased. By moving the head 47 in a counterclockwise direction, the effective area of the passage leading to pressure chamber 25 is increased. Adjustments may be made between limits of a substantially full open position of passage 41 to a substantially closed position. A selected position for the screw threaded member 46 is determined for each installation and set in the selected position. Thereafter further adjustment is practically unnecessary.

The pressure controlled vane 24 is mounted on shaft member 31 which extends through pressure chamber 25 and through the duct 11. The velocity damper 48 is mounted on shaft 31 within the air duct 11. The velocity damper 48 is provided with an off-set portion 49 adapted to facilitate the functioning of the velocity damper. The velocity damper substantially closes the air stream through the air duct 11. The velocity damper 48 is partially balanced in the air duct 11 and depends upon the velocity of flow of the air stream through duct 11 for its operation. In Figs. 3, 5, 6, 8 and 10, the velocity damper is illustrated in an off-position. That is, the air flow is practically shut off from the burner, due to the fact that a hole has developed in the fuel bed, allowing the air to escape at this point, or its course of least resistance, which has reduced the air pressure and increased the velocity. This increase in velocity will close damper 48 because the pressure on vane 24 has been reduced and is overcome by the velocity of air impinging upon damper 48. Thus, Fig. 5 represents the condition where increased flow from the right against the portion 49, or decreased pressure to the right of vane 24, has caused a closing of valve 48.

Fig. 7 shows the damper 48 in its open position. That is, when the fuel bed is in its normal condition and there are no holes to allow the air to escape. Backing up the air in this case reduces the velocity and increases the pressure in the air chamber, as well as in the air duct. This increase in pressure in this case is acting on vane 24 and has opened it against the reduced velocity impinging upon valve 48.

When starting a new fire or when a hole or holes develop in the fuel bed, the air pressure underneath the fuel bed is reduced and the air velocity is increased due to the escaping air without the back pressure. This loss of air at high velocity through the fuel bed at these points, prevents the burning of the fuel at other points and also chills the furnace gases and the furnace walls. This increase in velocity of the air in the duct will reduce the pressure on vane 24, and due to its shape, valve 48 will close (position as shown in Figs. 3, 5, 6, 8 and 10) and thereby cut off the air flow to the furnace, allowing the fuel bed to build up which closes all the free air openings; thereby reducing the velocity and increasing the pressure in the air duct. This increase of air pressure acts on vane 24, opening valve 48 to a point where the velocity head acting on valve 48 and the static pressure acting on vane 24 are balanced, allowing the correct amount of air to flow to the furnace, depending upon the condition of the fuel bed.

The action of vane 24 depends on the back pressure produced in chamber 25 by the movement of vane 24 which acts as a cushion to the operation of vane 24. This back pressure or air cushion in back of vane 24 is controlled by the position of screw threaded member 46 in the air port 40. That is, the movement of vane 24 is controlled by the air pressure in the duct 11, tending to move the vane 24 forward and this cushion effect allows vane 24 to become equalized in the compression chamber 25.

I have found the structure of my invention highly efficient in operation and while I have described my invention in one of its preferred embodiments, I desire that it be understood that modifications may be made and that no limitations upon my invention are intended other than may be imposed by the scope of the appended claims.

What I claim as new and desire to secure by Letters Patent of the United States is as follows:

1. Means for controlling the air supply to stokers comprising in combination with an air supply duct, a pressure chamber, said pressure chamber having a supporting plate member connected with one wall of said duct with an opening in said pressure chamber leading into said duct, an angularly movable shaft member extending through said pressure chamber and through said duct, a vane device operative under static pressure conditions carried by said shaft member and located in said pressure chamber, a separate valve device operative under dynamic pressure conditions in opposite relation to said vane device carried by said shaft member and located in said duct, a pair of limiting stops disposed in said pressure chamber for determining the limits of movement of the vane device therein, and means for regulating the ingress and egress of air at atmospheric pressure with respect to said pressure chamber for regulating the operation of said vane.

2. Means for controlling the air supply to stokers comprising in combination with an air supply duct, a pressure chamber carried by one wall of the air supply duct and communicating therewith, a shaft member extending through said air supply duct and through said pressure chamber, an operatively balanced valve system comprising a pressure controlled vane carried by said shaft member within said pressure chamber, and a valve device carried by said shaft member within said duct, said last mentioned valve device being shaped to provide an extended surface offering substantial resistance to increases in velocity of air through said duct and effecting movement of said valve device under condition of such increases in velocity, said pressure controlled vane operating to balance said valve device dynamically, and means connected with said pressure chamber for varying the rate of ingress and egress of air at atmospheric pressure with respect to said pressure chamber for regulating the operation of said vane.

3. Means for controlling the air supply to stokers comprising in combination with an air supply duct, a pressure chamber carried by one wall of the air supply duct and communicating therewith, a shaft member extending through said air supply duct and through said pressure chamber, an operatively balanced valve system comprising a pressure controlled vane carried by said shaft member within said pressure chamber, and a valve device carried by said shaft member within said duct, said last mentioned valve device extending in a plane surface of an area substantially less than the cross section of said duct and having a portion thereof below said shaft member bent at an angle and forming an air flow resisting surface, said valve device being movable upon increases in velocity of air through said duct to a substantially transverse position in said ducts, said pressure controlled vane operating through said shaft member to balance said valve device dynamically, and means connected with said pressure chamber for varying the rate of ingress and egress of air at atmospheric pressure with respect to said pressure chamber for regulating the operation of said vane.

ALBERT L. BRICE.